United States Patent [19]
Stewart

[11] Patent Number: 5,666,170
[45] Date of Patent: Sep. 9, 1997

[54] APPARATUS FOR DECODING VIDEO SIGNALS ENCODED IN DIFFERENT FORMATS

[75] Inventor: John S. Stewart, Indianapolis, Ind.

[73] Assignee: Thomson Consumer Electronics, Inc., Indianapolis, Ind.

[21] Appl. No.: 501,334

[22] Filed: Jul. 12, 1995

[51] Int. Cl.[6] .............................. H04N 5/455; H04N 7/26
[52] U.S. Cl. ........................ 348/726; 348/558; 348/432
[58] Field of Search ..................................... 348/725, 726, 348/553, 556, 558, 426, 429, 432; 375/324, 328, 340, 341, 346, 348, 350

[56] References Cited

U.S. PATENT DOCUMENTS

| | | | |
|---|---|---|---|
| 4,309,719 | 1/1982 | Hinn | 358/21 R |
| 5,119,177 | 6/1992 | Lim | 358/21 R |
| 5,253,044 | 10/1993 | Lamy | 358/21 R |
| 5,282,019 | 1/1994 | Basile et al. | 358/12 |
| 5,475,442 | 12/1995 | Matsushita et al. | 348/556 |
| 5,497,401 | 3/1996 | Ramaswamy et al. | 375/341 |
| 5,506,636 | 4/1996 | Patel et al. | 348/725 |
| 5,510,848 | 4/1996 | Nocture et al. | 348/556 |
| 5,512,957 | 4/1996 | Hulyalkar | 348/21 |

FOREIGN PATENT DOCUMENTS

| | | |
|---|---|---|
| 0 681 400 | 11/1995 | European Pat. Off. |
| WO94/28656 | 12/1994 | WIPO |
| WO95/15656 | 6/1995 | WIPO |
| WO96/02100 | 1/1996 | WIPO |

OTHER PUBLICATIONS

"Concept of a European System for the Transmission of Digitized Television Signals Via Satellite" by U. Reimers, SMPTE Journal, vol. 103, No. 11, 1 Nov. 1994, pp. 741–747.

"A Flexible Bit–Rate Transmission System for Digital HDTV Outside Broadcasting by Satellite", by A. Morello, I.E.E.E. Proceedings of the Global Telecommunications Conference (Globecom), vol. 3 of 4, pp. 1622–1627, 29 Nov. 1993.

"Digital Video Transmission", by J. Waltrich, Annual Review of Communications, vol. 47, pp. 772–775, 1 Jan. 1993.

"Digital Video Compression and Transmission Common Elements for Cable, Satellites and Terrestrial Networks?", by L. Stenger, Postes: Telephones et Telegraphes Suisses, No. SYMP. 18, pp. 444–457, 11 Jun. 1993.

"Multirate All–Digital Model for Support of Universal Multiplex Transport Layer for Digital Compression", by F. Harris et al., Proceedings from Eleven Technical Sessions of the Annual Convention and Exposition of the National Cable Television Association, no. Convention 42, pp. 289–293, 6 Jun. 1993.

(List continued on next page.)

*Primary Examiner*—Victor R. Kostak
*Attorney, Agent, or Firm*—Joseph S. Tripoli; Ronald H. Kurdyla; Alexander J. Burke

[57] ABSTRACT

An adaptive receiver includes an adaptive decoder for providing decoded output data from a video signal encoded for satellite, terrestrial or cable transmission. The apparatus includes an adaptive decoder for providing a first decoded output as a function of a code rate selected from a plurality of code rates. The apparatus also includes an adaptive deinterleaver for deinterleaving the first decoded output in accordance with a deinterleaving function selected from a plurality of deinterleaving functions. In addition, the apparatus includes an output signal processor for processing the deinterleaved output data to provide the decoded output data. The demodulator may also incorporate a an adaptive error decoder for detecting and correcting errors in the deinterleaved output. In addition, a signal quality detector may provide an estimate of the error in the decoded output data. The apparatus is automatically configured to be compatible with the encoded video signal format in response to the error estimate.

22 Claims, 6 Drawing Sheets

OTHER PUBLICATIONS

"*A 45-Mbit/sec. VLSI Viterbi Decoder for Digital Video Applications*", by G. Edwards, I.E.E.E. Commercial Applications and Dual Use Technology, no. –, pp.127–130, 16 Jun. 1993.

D. Bryan, "*QAM For Terrestrial and Cable Transmission*", IEEE Transactions on Consumer Electronics, vol. 41, No. 3, August 1995, pp. 383–391.

F. M. Gardner, "*BPSK/QPSK Timing–Error Detector for Sampled Receivers*", IEEE Transactions on Communications, vol. COM–34, No. 5, May 1986, pp. 423–429.

"*Specification of the Baseline Modulation/Channel Coding System for Digital Multi–Programme Television by Satellite*", by the European Broadcasting Union, Nov. 19, 1993, 21 pp.

APPARATUS FOR DECODING VIDEO SIGNALS ENCODED IN DIFFERENT FORMATS

FIELD OF THE INVENTION

This invention is related to the field of digital signal processing, and more particularly to demodulation and decoding of video signals encoded to different standards for satellite or terrestrial transmission, for example.

BACKGROUND OF THE INVENTION

Digital television systems used for terrestrial or satellite broadcast modulate and encode television signals for transmission by different methods and in different signal formats. The particular method and format adopted may be prescribed by an internationally recognized specification. One such specification, prepared for a European satellite communications system, is the "Specification of the Baseline Modulation/Channel Coding System for Digital Multi-Programme Television by Satellite" by the European Broadcasting Union, 19th Nov. 1993. This system is also known as the Direct Video Broadcast (DVB) system and covers both satellite and cable television signal distribution. Another transmission system, already in use in the United States and defined by a proprietary commercial specification, is the Digital Satellite System (DSS). However, whether the transmitted signal format is prescribed by a recognized standard or a proprietary commercial specification, a video signal receiver must be capable of receiving the transmitted signal format. A system for receiving different transmitted signal formats in the context of different types of transmission such as satellite, terrestrial and cable transmission is disclosed in U.S. patent application Ser. No. 08/342,280, Nov. 18th, 1994, entitled "A Branch Metric Computer for a Viterbi Decoder of a Punctured and Pragmatic Trellis Code Convolutional Decoder Suitable For Use in a Multi-Channel Receiver of Satellite, Terrestrial and Cable Transmitted FEC Compressed-Digital Television Data" by J. S. Stewart et al.

A video signal receiver employs demodulation and decoding functions that are specifically related to the signal format to be received. The demodulation function depends on the type of modulation, the signal shape, the data rate employed by the transmission system, and whether a single or differential output is required. The decoding function depends on the type of encoding, scrambling, interleaving and the code rate employed by the transmission system encoder.

SUMMARY OF THE INVENTION

In accordance with the present invention it is recognized that a signal processing network can advantageously accommodate multiple decoding functions in the context of a digital television signal processing system, for example. In accordance with the principles of the invention, a disclosed digital signal processing network provides adaptive decoding networks incorporating different types of decoding functions, illustratively related to code rate, deinterleaving, and error processing functions.

In a system for receiving and adaptively processing a video signal encoded in one of a plurality of different formats suitable for satellite, terrestrial or cable transmission, apparatus in accordance with the principles of the invention provides decoded output data. In an illustrated embodiment, the apparatus includes an adaptive decoder for providing a first decoded output as a function of a code rate selected from a plurality of code rates. The apparatus also includes an adaptive deinterleaver for deinterleaving the first decoded output in accordance with a deinterleaving function selected from a plurality of deinterleaving functions. In addition, the apparatus includes an output signal processor for processing the deinterleaved output data to provide the decoded output data.

In accordance with a feature of the invention, an adaptive error decoder detects and corrects errors in an adaptive decoder output.

In accordance with another feature of the invention, a an adaptive deinterleaver deinterleaver the encoded video signal and an adaptive error decoder detects and corrects errors in the deinterleaved output.

In accordance with a further feature of the invention, a signal quality detector provides an estimate of the error in the decoded output data. The apparatus is automatically configured to be compatible with the encoded video signal format in response to the error estimate.

DETAILED DESCRIPTION OF THE DRAWINGS

Figure 1:
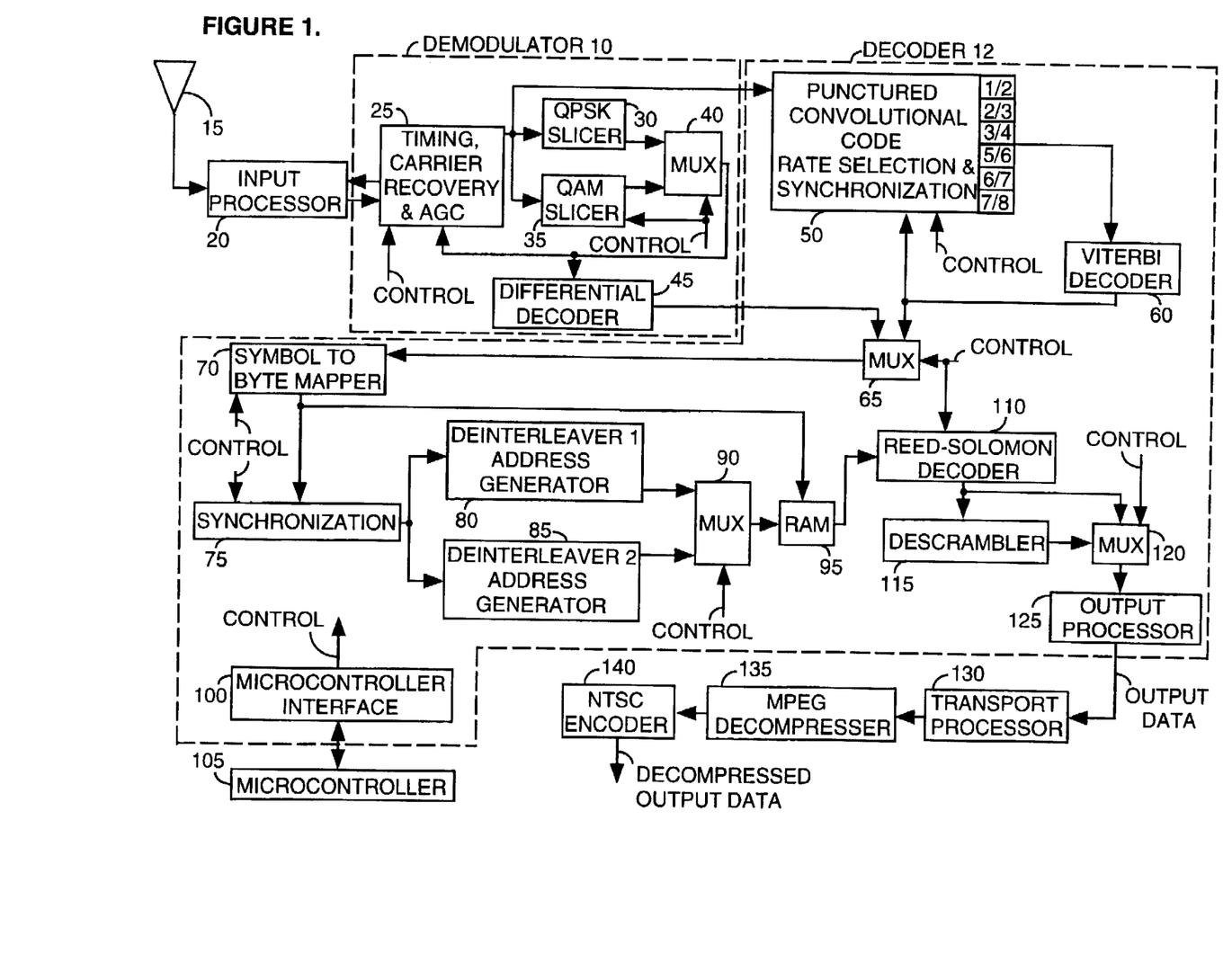
FIG. 1 is a block diagram of apparatus according to the principles of the invention for adaptively demodulating and decoding signals encoded in DSS and DVB formats.

A system according to the invention for demodulating and decoding signals of different signal format such as satellite and cable television signals is shown in FIG. 1. In particular, this system is configurable to demodulate and decode signals in DSS satellite, DVB satellite or DVB cable signal formats. This configurability has been achieved by maximizing the use of functions common to the demodulation and decoding process of the three signal formats. It has also been achieved through appropriate selection, implementation and interfacing of the demodulation and decoding functions.

Figure 2:
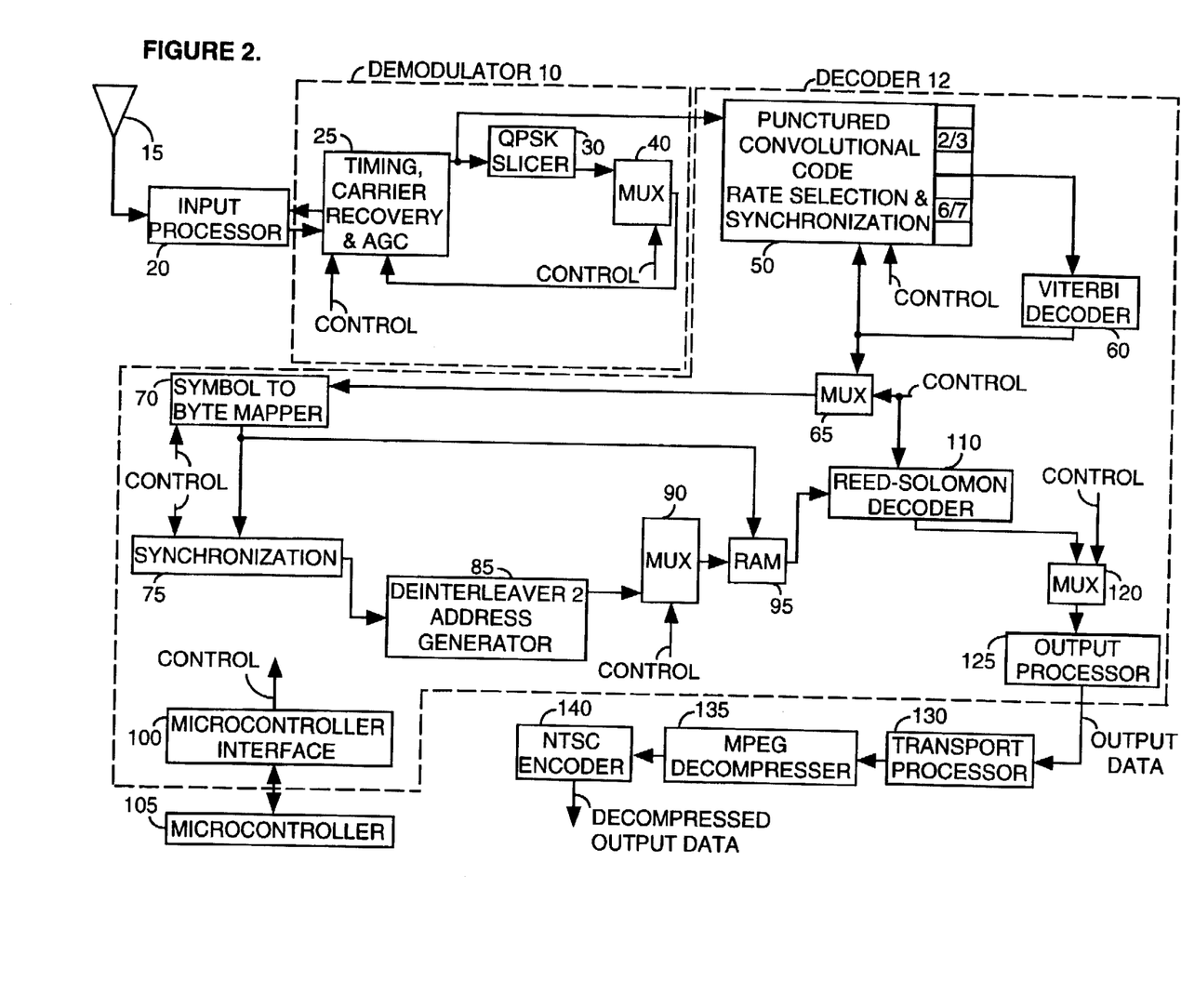
FIG. 2 is a block diagram showing the elements of FIG. 1 configured to demodulate and decode a DSS satellite signal format.
Figure 3:
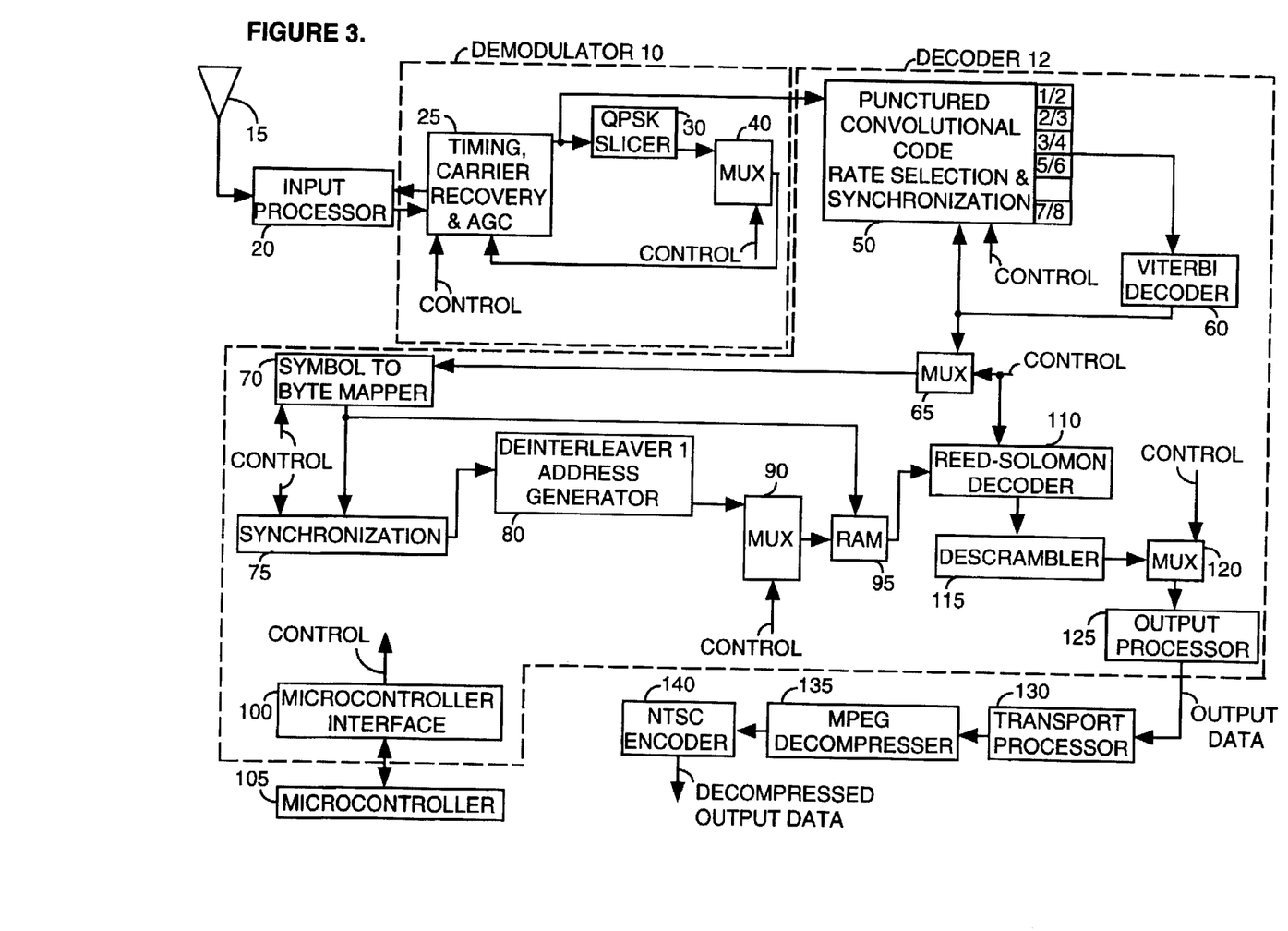
FIG. 3 is a block diagram showing the elements of FIG. 1 configured to demodulate and decode a DVB satellite signal format.
Figure 4:
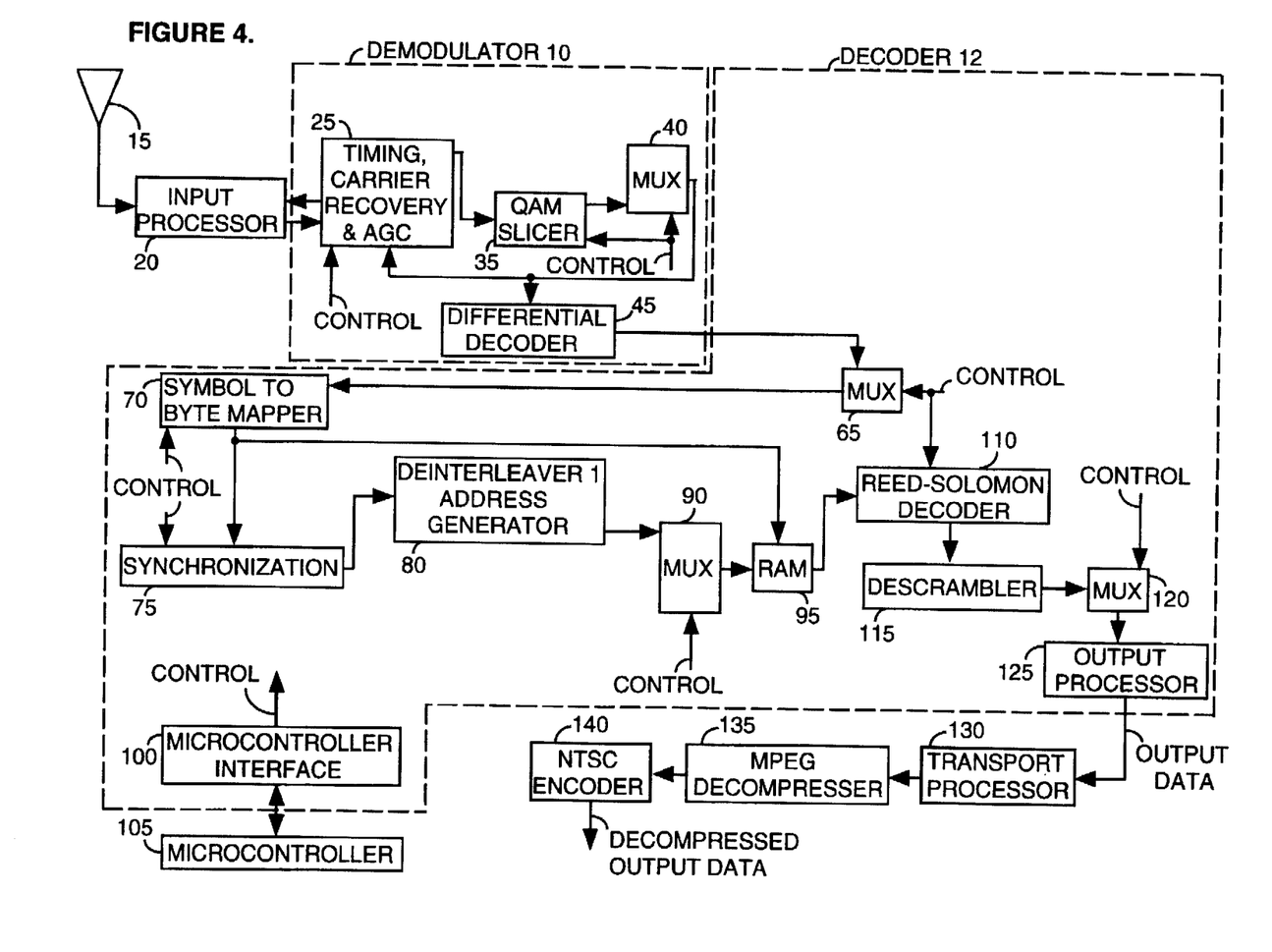
FIG. 4 is a block diagram showing the function elements of FIG. 1 configured to demodulate and decode a DVB cable signal format.

In FIG. 1, a carrier modulated with video data is received by an antenna 15, processed and digitized by network 20. The resultant digital output signal is demodulated by demodulator 10 and deemed by decoder 12. The output from decoder 12 is further processed to provide decompressed output video data suitable for display by a display device. Both demodulator 10 and decoder 12 are adaptive demodulation and decoding networks incorporating different types of demodulation and decoding functions which are selected by microcontroller 105 via interface 100. Both demodulator 10 and decoder 12 are configured by a Control signal from microcontroller interface 100. The status of the Control signal provided by interface 100 is determined by signals provided by microcontroller 105 to interface 100. In FIG. 2, demodulator 10 and decoder 12 of FIG. 1 are configured to receive a DSS satellite signal format. In FIGS. 3 and 4, demodulator 10 and decoder 12 of FIG. 1 are configured to receive DVB satellite and DVB cable signal formats respectively. Both configurable demodulator 10 and configurable decoder 12 may be advantageously accommodated in a single signal processing device such as an integrated circuit, for example.

Configurable demodulator 10 provides the functions required for demodulating each of the DSS and DVB signal formats. The primary functions of demodulator 10 are recovery and tracking of the carrier frequency, recovery of the transmitted data clock frequency, and recovery of the video data itself. In addition, the demodulator includes an AGC network (FIG. 5) to appropriately scale analog input data prior to analog to digital conversion in unit 20. The demodulator functions are implemented by units 25, 30, 35, 40 and 45. Timing recovery, carrier recovery, slicer and differential decoder operations are individually known and generally described, for example, in the reference text *Digital Communication*, Lee and Messerschmidt (Kluwer Academic Press, Boston, Mass., U.S.A., 1988).

The different functional characteristics exhibited by demodulator 10 in the three signal format modes are shown in Table I.

TABLE I

Demodulator 10 functions in DSS and DVB modes.

| Clock rate | DSS rate 1 | DVB satellite rate 2 | DVB cable rate 3 |
|---|---|---|---|
| Feed Forward Equalization | No | No | Yes |
| Decision Feedback Equalization | No | No | Yes |
| Excess Bandwidth Factor | 20% | 35% | 15% |
| Modulation type | QPSK | QPSK | QAM |
| Selectable signal constellation | No | No | Yes 64 point or 256 point |
| Differential output decoding | No | No | Yes |

Demodulator 10 accommodates differences in data clock rate, Feed Forward Equalization, Decision Feedback Equalization, Excess Bandwidth Factor (EBF), modulation type, symbol constellations and decoding for the three input signal formats listed in Table I. The difference in clock rate is accommodated by ensuring the system is capable of operating at the highest and lowest data clock frequencies of the three input signal formats. The other differences are accommodated by configuring the demodulation functions concerned as described below.

Figure 5:
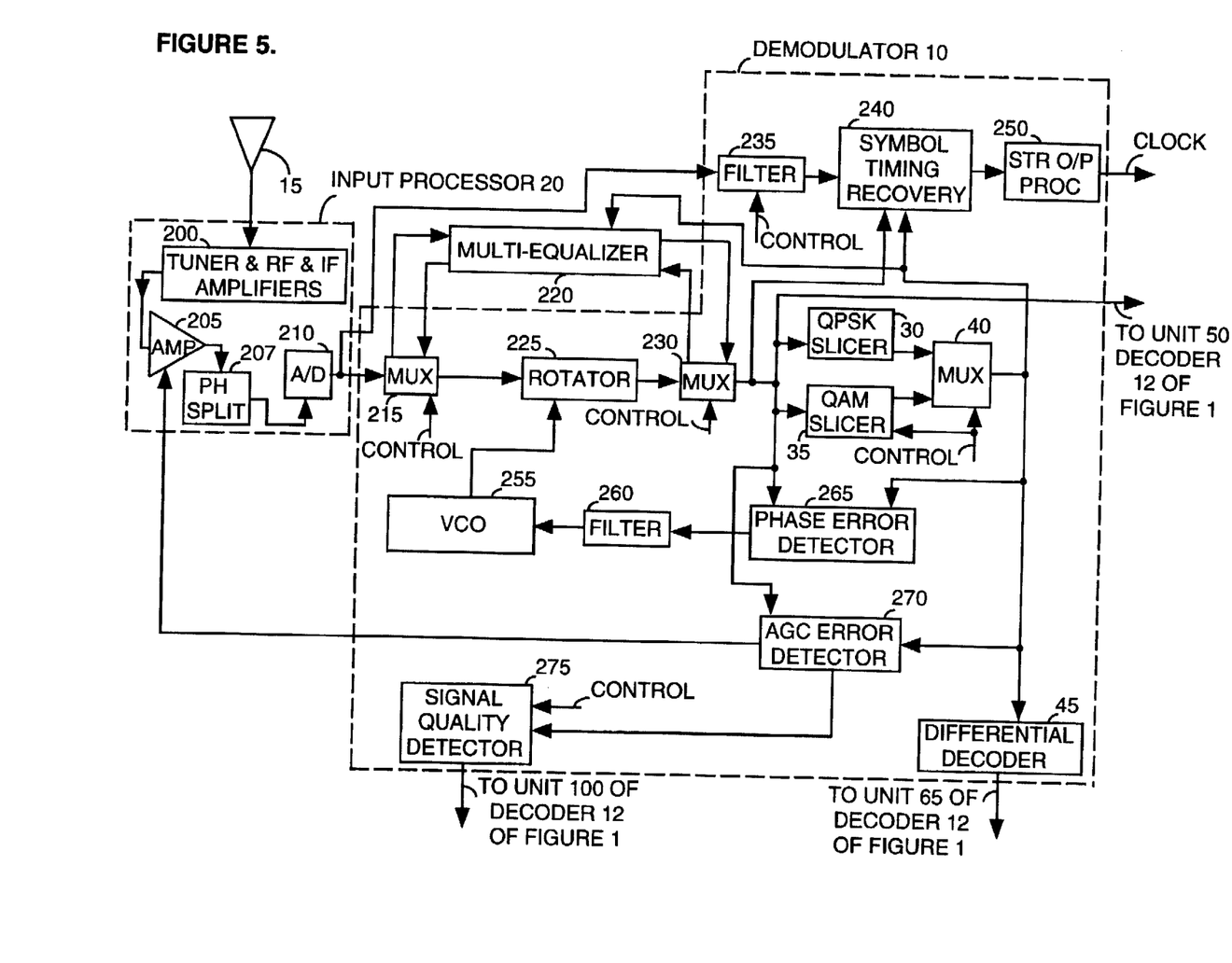
FIG. 5 is a more detailed block diagram of the demodulating apparatus of FIG. 1.

FIG. 5 depicts demodulator 10 of FIG. 1 in greater detail. In FIG. 5, an input signal from antenna 15 is received, converted to digital form and processed by input network 20. Network 20 includes radio frequency (RF) tuner and intermediate frequency (IF) mixer and amplification stages 200 for down-converting the input video signal to a lower frequency band suitable for further processing. Network 20 also includes a gain controlled amplifier 205 and a phase splitting network 207. The phase splitting network splits the received video signal into quadrature I and Q components. Amplifier 205 appropriately scales the I and Q components for digitization by analog to digital converters 210 within network 20. An Automatic Gain Control (AGC) signal for amplifier 205 is provided by AGC error detector network 270 described later. A digital signal from unit 210 is provided to multiplexer 215 of demodulator 10.

In satellite mode, multiplexer 215, as determined by the Control signal, steers the digitized video signals from network 20 to rotator 225 and bypasses a Feed Forward Equalizer (FFE) within unit 220. In cable mode, multiplexer 215, as determined by the Control signal, steers the digitized signals to rotator 225 (e.g., a complex multiplier) via the Feed Forward Equalizer of unit 220. The Feed Forward Equalizer is an adaptive FIR type digital filter and compensates for transmission channel perturbations such as frequency/phase irregularities.

The output data from multiplexer 215 is processed by a carrier recovery loop comprised of units 225, 220, 230, 30, 35, 40, 265, 260 and 255 for recovering the baseband video information. The data from unit 215 is a symbol sequence in the form of complex I and Q quadrature components at the input to carrier recovery loop rotator 225. This symbol sequence is a binary data sequence where each symbol is represented by assigned digital values. The set of symbols may be represented in a complex plane as a set of points called a signal constellation, as known. The DSS and DVB satellite signal formats use a Quadrature Phase Shift Keying (QPSK) symbol constellation of 4 points, and the DVB cable signal format uses a Quadrature Amplitude Modulated (QAM) symbol constellation of either 64 or 256 points. The carrier recovery loop compensates for symbol point offset and symbol point rotation caused by phase and frequency jitter in the carrier frequency introduced by the transmission channel. This is accomplished by deriving an error signal from recovered data, followed by applying the error signal to the loop input data to compensate for the phase and frequency jitter using a complex multiplier (rotator 225). The functions of the carrier recovery loop elements are each performed for both the I and Q complex signal components, using known signal processing techniques.

The complex multiplier function of rotator 225 multiplies the unit 215 output data by compensation components from Voltage Controlled Oscillator (VCO) 255 to produce compensated data as an output. The compensated data from rotator 225 is passed to slicers 30 and 35 via multiplexer 230. In a satellite mode, the Control signal causes multiplexer 230 to bypass the decision feedback equalizer (DFE) of unit 220. In contrast, in cable mode, the Control signal causes multiplexer 230 to steer the compensated data from rotator 225 to the DFE within unit 220. The DFE sums this compensated data from rotator 225 with a delayed, scaled version of the selected slicer output from multiplexer 40. This summing operation is a known decision feedback equalization process and reduces inter-symbol interference in the compensated data output of rotator 225. In those applications where such interference is not significant the DFE may be omitted. The feedback equalized data from unit 220 is returned to multiplexer 230 and passed to slicers 30, 35 and Viterbi unit 50 of decoder 12.

Both multiplexers 230 and 215 may be part of equalizer 220, or eliminated if a fixed satellite, terrestrial or cable demodulation configuration is desired. In addition, although both the FFE and the DFE equalizers of unit 220 are shown external to demodulator 10, they may be included with demodulator 10 in a single integrated circuit network. In that case, the adaptive FFE and DFE equalizers may be configured for a particular mode by programming appropriate filter coefficients using the Control signal.

As indicated in Table I, the satellite input signal formats are QPSK modulated and the cable input signal format is a QAM type. The particular slicer used in the system is selected by the configuration Control signal via multiplexer 40 depending on whether the input signal format is a satellite QPSK or cable. QAM type. In addition, in the cable mode, the QAM slicer 35 is also configured for the particular QAM symbol constellation involved, as indicated in Table I. Then, slicer 35 exhibits either a 64 point or 256 point constellation slicer function in response to the configuration Control signal.

The corrected output from multiplexer 230, which is unequalized in satellite mode and feedback equalized in cable mode, is passed to slicers 30 and 35. Slicer 30 processes the corrected output from multiplexer 230 to recover data from Quadrature Phase Shift Keying (QPSK) modulated signals. Similarly, slicer 35 recovers data from QAM signals. Slicers 30 and 35 apply a series of decision thresholds to the corrected output from multiplexer 230 in order to recover the symbol sequence of the original demodulator 10 input data. Then, in satellite mode, the data used by the receiver is recovered from the corrected output of multiplexer 230 by Viterbi detection units 50 and 60 of decoder 12 (FIG. 1). In contrast, in cable mode, the recovered data used by the receiver is provided by the selected slicer (30 or 35) and output by multiplexer 40. The output of multiplexer 40 is differentially deemed by unit 45 and passed to multiplexer 65 of decoder 12 (FIG. 1). In cable mode, multiplexer 65 (FIG. 1) responds to the Control signal by selecting the differential decoded output from unit 45 for further processing, and bypasses Viterbi decoder units 50 and 60 in FIG. 1. Differential encoding/decoding is a known technique used (in cable mode) to overcome the problem associated with potential phase ambiguity in the derived carrier and recovered symbol constellation. The recovered data output from multiplexer 40 is used in both satellite and cable modes by the carrier recovery loop, timing recovery, network, signal quality detector and AGC functions of demodulator 10.

Continuing with FIG. 5, the input to slicers 30, 35 and recovered data output from multiplexer 40 are processed by carrier recovery loop phase error detector 265, low pass filter 260 and VCO 255, to provide the I and Q feedback compensation signal components used by rotator 225. Phase detector 265 determines an error signal representing the phase and frequency difference between the input to slicers 30 and 35, and the slicer output from multiplexer 40. This error signal is low pass filtered by unit 260 and is used by VCO 255 (as known) to generate I and Q quadrature compensation components which are applied by rotator 225 to provide error compensated signals to multiplexer 230. By this means the signals applied to multiplexer 230 are compensated for phase and frequency errors associated with symbol point offset and symbol point rotation introduced during transmission.

The input to slicers 30, 35 and the recovered data output signal from multiplexer 40 are also used by AGC error detector 270 to form a gain control signal. This control signal controls the gain of amplifier 205 in processor 20, and ensures that the I and Q input signals to the analog to digital converters of processor 20 are appropriately sealed as required for proper analog to digital conversion. Detector 270 computes an error based on the difference between the sum of the squares of the quadrature components of the signal input to slicers 30, 35 (Im, Qm), and the sum of the squares of the quadrature components of the output from multiplexer 40 (Is, Qs).

Figure 6:
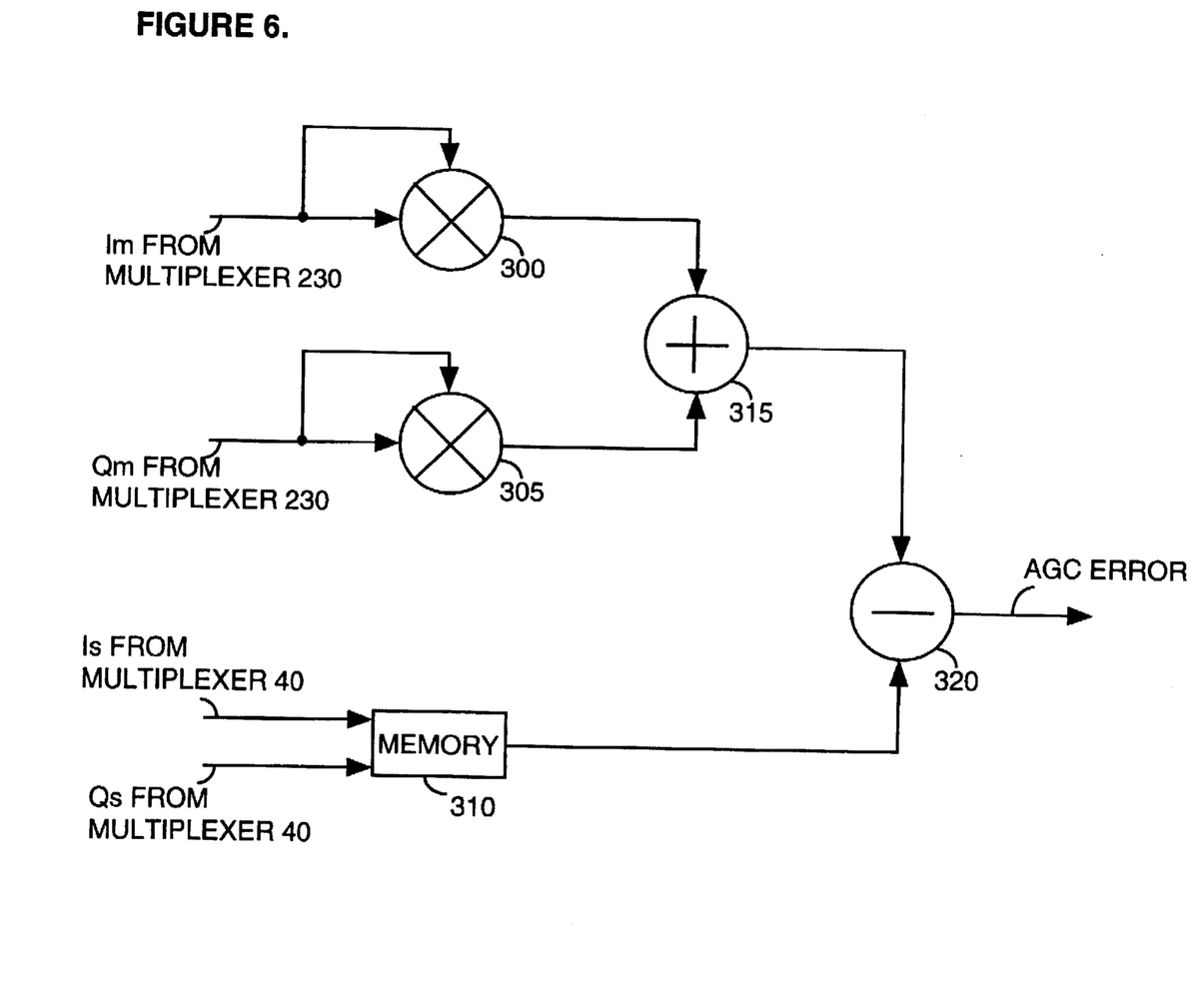
FIG. 6 is a block diagram showing the AGC error computation function of the demodulating apparatus of FIG. 5.

FIG. 6 shows an implementation of the AGC error computation function within detector 270. The slicer 30, 35 quadrature input components Im, Qm from multiplexer 230 are squared by multipliers 300 and 305 and summed by adder 315. In addition, the quadrature components Is, Qs of the recovered data output from multiplexer 40 are used to access a stored value in a look-up table in memory 310. This stored value represents the sum of the squared values of Is and Qs. The stored value from memory 310 is then subtracted from the output of adder 315 by subtractor 320 to produce the resultant AGC error. The computed AGC error used by detector 270 in the FIG. 6 implementation is given by:

$$AGC\ error = (Im^2 + Qm^2) - (Iss^2 + Qss^2).$$

The term $(Im^2+Qm^2)$ is obtained from unit 315 and the term $(Iss^2+Qss^2)$ is obtained from look-up table 310 as an approximation of $(Is^2+Qs^2)$ using Is and Qs as input pointers. This AGC error has the advantage of being a function of the difference in vector distance between the Im, Qm point and the Is, Qs point with respect to an origin (0,0) point. It also has the advantage of being independent of angular difference between vectors represented by the Im, Qm and Is, Qs quadrature components. Because the AGC error signal exhibits these characteristics, it may be low pass filtered and used for controlling the gain of AGC amplifier 205.

This AGC error computation is used in preference to the actual error to reduce computational complexity. The actual AGC error is given by:

$$Actual\ AGC\ error = \sqrt{(Im^2 + Qm^2)} - \sqrt{(Is^2 + Qs^2)}$$

As an alternative, the actual error function or another modified version of the actual error function may be Used instead of the FIG. 6 AGC error signal implementation.

The computed AGC error signal is low pass filtered within detector 270 of FIG. 5 to produce an output signal for controlling the gain of amplifier 205. The AGC error signal is also provided to signal quality detector unit 275.

Signal quality detector 275 estimates the signal to noise ratio (SNR) of the input signal to demodulator 10 using the AGC error signal provided by unit 270. Unit 270 first forms the absolute value of the AGC error signal. Then unit 270 applies decision thresholds to the result to determine whether the AGC error lies within a programmed range of values. This provides a determination of the magnitude of the AGC error value which corresponds to an estimate of SNR value. This SNR estimate is provided to microcontroller 105 via interface 100 in FIG. 1. Microcontroller 105 is programmed to determine whether the SNR value lies outside a predetermined range. If the SNR value is outside the predetermined range, microcontroller 105 may re-configure the system including all the configurable elements of demodulator 10, equalizer 220 and decoder 12 for a different input signal format. In this way, microcontroller 105 may iteratively re-configure demodulator 10 and decoder 12 functions by using the Control signal via interface 100 to appropriately demodulate and decode the applied input signal format. This configuration function may be programmed to be performed as part of an initialization procedure or in response to an input signal to the microcontroller from an operator accessible switch, for example. In addition, signal quality detector 275 may use other methods for making an estimate of error or SNR in the demodulated data. These methods include, for example, a mean squared error calculation between the pre-slicer and post-slicer data in the carrier recovery loop. A mean squared error calculation and other error estimation methods are described in *Digital Communication*, Lee and Messerschmidt (Kluwer Academic Press, Boston, Mass., U.S.A., 1988) and other texts.

The sampling and synchronization clocks used by demodulator 10 in FIG. 5 are generated by elements including filter 235, symbol timing recovery unit 240 and output processor 250. The outputs from the analog to digital converters 210 of processor 20 are band pass filtered by configurable filter 235 to compensate for variations in Excess Bandwidth (EB) as expressed by the Excess Bandwidth Factor (EBF). Although the preferred embodiment uses a band pass filter, other filter characteristics such as a low pass filter may be used for EBF compensation. The resulting output, the input signals to slicers 30 and 35, and the selected slicer output of multiplexer 40 are used by timing recovery unit 240 to generate the sampling and synchronization clocks. These recovered clocks correspond to transmitter clocks and are used for timing the operation of demodulator 10, processor 20 (in particular the analog to digital conversion), and equalizer 220.

In deriving the required timing information, the timing elements of FIG. 5 use a digital signal from analog to digital converters 210. Although the signal prior to digitization by converters 210 exhibits the same raised cosine shape for all three signal formats, the variations in Excess Bandwidth Factor (EBF) detailed in Table I may alter this shape. The EBF is a parameter indicating the degree to which the actual system bandwidth exceeds the minimum bandwidth required to ensure accurate signal recovery. Both the EBF and the raised cosine shape are described in the reference text *Digital Communication*, mentioned previously. The variation in EBF and input signal shape between the input signal formats may cause an error in the recovered timing clocks. In order to compensate for this timing error, the I and Q outputs from the analog to digital converters 210 are filtered by unit 235 prior to timing and clock generation in unit 240. Filter 235 is programmed by microcontroller 105 via interface 100 to filter the digital video signal from converters 210 for proper clock and timing recovery for each of the EBF values of the three input signal formats as shown in Table I. Filter 235 may be programmed to compensate for various signal shapes and EBF values in addition to those of the described three input signal formats of Table I. Also, filter 235 may also be programmed to pass signals without any filtering, e.g., for test purposes.

Within unit 240 the error compensated data from filter 235 is compared both with the data input to slicers 30, 35 and with the recovered data output from multiplexer 40. Based on this comparison unit 240 derives a phase and timing error signal which is applied to symbol timing output processor 250. The signal comparison and derivation of the timing error signal is performed in accordance with known principles as detailed for example in "BPSK/QPSK Timing-Error Detector for Sampled Receivers", by F. M. Gardner, I.E.E.E. Transactions on Communications, May 1986. The phase and timing error signal from unit 240 is filtered and buffered by output processor 250 to provide a control signal to a voltage controlled crystal oscillator (VCXO) device included in unit 250. In the preferred embodiment the VCXO is a separate device, though an integral VCXO may be used. The control signal input to the VCXO controls both the frequency and phase of the sampling and synchronization clock signal output by the VCXO. This sampling and synchronization clock output is used by analog to digital converters 210 and other demodulator elements.

In FIG. 1, configurable decoder 12 provides the functions required for decoding the DSS and DVB signal formats. The primary functions of decoder 12 include a punctured convolutional Viterbi decoder 50, 60, a symbol to byte mapper 70, a deinterleaver network 75, 80, 85, 90, 95, a Reed-Solomon decoder 110, and a descrambler 115. These individual functions are known and described, for example, in the reference text *Digital Communication*, noted previously. The operating characteristics of the decoder 12 elements are shown in Table II for DSS and DVB modes.

TABLE II

Decoder 12 functions in DSS and DVB modes.

| | DSS | DVB satellite | DVB cable |
|---|---|---|---|
| Data punctured convolutional code rates | 2/3 6/7 | 1/2 2/3 3/4 5/6 7/8 | Not applicable |
| Viterbi decoder | Yes | Yes | No |
| Symbol to byte mapper | 1→8 bits per symbol | 1→8 bits per symbol | 6→8 (64-QAM) bits per symbol 8→8 (256-QAM) symbol |
| Deinterleaver type | Ramsey | Forney | Forney |
| Descrambler | No | Yes | Yes |

Decoder 12 accommodates differences in code rate, deinterleaver type, symbol to byte mapping and descrambler requirements for the three input signal formats, as listed in Table II. The differences are accommodated by configuring the decoder 12 functions as described below.

Decoder stages 50 and 60 constitute a punctured convolutional Viterbi decoder capable of decoding the various code rates shown in Table II. Units 50 and 60 process, decode and error correct the filtered digital video signal output from unit 25 which is applied to the input of unit 50. These units provide a first level of correction of random transmission errors. In the DSS satellite signal configuration one of two possible code rates (⅔ or 6/7) may be selected. In contrast, in the DVB satellite signal configuration one of five possible code rates (½, ⅔, ¾, ⅚, or ⅞) may be selected. The term "code rate" in this context defines the error correction overhead carried by the coded data. For example, a code rate of ½ means that 2 data bits are encoded for each bit of input data. Similarly, a code rate of ⅞ means 8 data bits are encoded for each 7 bits of input data. The variable code rate of the transmitted data stream is achieved by deleting bits from an encoded data stream coded with a base code rate of ½. For example, to achieve a code rate of ⅔ one of the 4 bits produced by coding 2 input data bits at the ½ code rate is deleted leaving 3 bits to be transmitted. The other code rates are achieved using the same principle.

Unit 50 includes provisions for synchronization of the video signal input data stream to allow Viterbi decoding and insertion of "place-holder" dummy bits. This is accomplished by using a synchronization state machine which is configured by the Control signal via interface 100 for the particular code being received. Synchronization is achieved by identifying and resolving both bit position and phase ambiguities in the input data stream. The bit position and phase ambiguities are identified by a process of receiving, decoding, re-encoding and comparing the re-encoded data with the input data. Successful synchronization is indicated by an acceptable error rate between re-encoded and original input data. For this process, all the possible states arising from phase and bit position ambiguities in the input signal are tested by the synchronization state machine. If synchronization has not been achieved, an out-of-lock indication is generated by unit 50. This indication causes VCO 255 of demodulator 10 (FIG. 5) to insert a code type and configuration dependent phase shift into the input data stream. This synchronization process is repeated until lock is achieved. Although this is the preferred synchronization method, other methods using different operating sequences are also possible.

After the data stream has been synchronized-as discussed above, replacement "place-holder" dummy bits equal in number to bits deleted at the transmitter are inserted into the data stream. A configurable state machine in unit 50 is used to insert the appropriate "place-holder" dummy bits for the particular code type and code rate of the received data stream. Unit 50 is configured for the selected code rate by loading a register within unit 50 in response to the Control signal conveyed from microcontroller 105 via interface 100. The "place-holder" bit insertion state machine is configured to insert the correct number of place-holder bits for the appropriate code rate selection in response to the loaded register information. Similarly, the Viterbi synchronization network of unit 50 is also appropriately configured using this information. After the "place-holder" bit insertion, a fixed base code rate of ½ is output from unit 50. This means that the various transmitted code rates shown in Table II are all decoded using a single Viterbi decoder 60 that operates at the fixed base code rate (½). The "place-holder" bits inserted in unit 50 are identified within Viterbi decoder 60. The information gained from this place-holder bit identification allows the Viterbi decoder algorithm to correctly decode the data. The resultant Viterbi decoder 60 output is provided to multiplexer 65.

In a satellite input signal configuration, the output of Viterbi decoder 60 is provided to symbol to byte mapper 70 by multiplexer 65 in response to the Control signal from interface 100. Mapper 70 converts a single bit output of Viterbi decoder 60 to an 8 bit mapped data byte. Alternatively, in cable signal input configuration the differentially decoded output of unit 45 is provided to mapper 70 by multiplexer 65 in response to the Control signal status. In addition, in cable input signal configuration the function of mapper 70 varies depending on whether a 64 or a 256 point symbol constellation is selected. If a 64 point QAM constellation has been selected, mapper 70 converts a 6 bit symbol code for each of the 64 points of the constellation to an 8 bit mapped data byte. In contrast, in the 256 point QAM constellation configuration, mapper 70 converts an 8 bit symbol code for each of the 256 points of the constellation to an 8 bit mapped data byte. The symbol to byte mapping transformation may be varied depending on the chosen symbol constellation and the output byte requirements of the system.

The mapped data output of mapper 70 is provided to synchronization unit 75 and memory 95 for further processing. This mapped data output is interleaved data. That is, data that has been arranged in a prescribed sequence prior to transmission. The purpose of the interleaving operation is to spread or disperse data in time in a predetermined sequence, such that a data loss during transmission does not result in a loss of contiguous data. Instead, any data lost is dispersed and is therefore more easily concealed or corrected. Synchronization unit 75 and memory 95 together with deinterleaver address generators 80, 85 and multiplexer 90 constitute a configurable deinterleaver function for restoring data to its original sequence. In DSS mode, a deinterleaving algorithm proposed by Ramsey as described in "Realization of Optimum Interleavers," IEEE Transactions on Information Theory, vol. IT-15, May 1970, is used. In contrast, in DVB mode an algorithm proposed by Forney as described in "Burst-Correcting Codes for the Classic Bursty Channel," IEEE Transactions on Communications Technology, vol. COM-19, October 1971, is used.

Synchronization network 75 detects sync words in the interleaved data signal and provides output signals synchronized to the beginning of data. The sync words are not themselves interleaved, but occur at periodic intervals in time. To enable sync word detection, information identifying the sync words and the expected data packet lengths is loaded into registers within unit 75. This information is provided by microcontroller 105 via interface 100 by means of the Control signal. Output synchronization signals from unit 75 are provided to address generators 80 and 85 for synchronizing the address signals from units 80 and 85 with the interleaved data from mapper 70. The generated address signals are then applied to memory 95 via multiplexer 90.

In DSS mode, multiplexer 90, in response to the Control signal status, applies address signals from generator 80 to memory 95. In DVB mode, multiplexer 90 applies address signals from generator 85 to memory 95 in response to a different Control signal status. Generator 80 is used in the DSS mode to implement the Ramsey deinterleaving function, and generator 85 is used in the DVB mode to implement the Forney deinterleaving function. These deinterleaving functions are implemented using logic state machines. Generators 80 and 85 produce a sequence of read and write addresses and associated memory control signals (such as read, write and output enable) which are passed via multiplexer 90 to memory 95. The sequence of write addresses produced by generators 80, 85 ensures that the interleaved data from mapper 70 is written into memory locations of memory 95 in the order in which the input interleaved data is received. The sequence of read addresses produced by generators 80, 85 ensures that data is read out of memory 95 in the desired deinterleaved order. The resultant deinterleaved output data from memory 95 is provided to Reed-Solomon decoder 110. Additional background information concerning the operation of the configurable deinterleaver function is presented in co-pending U.S. patent application Ser. No. 08/346,950, of J. S. Stewart.

Reed-Solomon decoder 110 operates in all modes of decoder 12 and decodes and error corrects the deinterleaved output data from memory 95. Reed-Solomon decoder 110 is configured by internal registers which are loaded in response to the Control from interface 100. Information loaded into these registers configures unit 110 to decode the particular packet lengths of data expected in the deinterleaved output data from memory 95. The information may also include other configuration parameters such as the number and type of parity bytes expected in the data, the number of error correction bytes per packet, and parameters selecting the type of Reed-Solomon decoder function employed, for example.

The Reed-Solomon decoded data output from unit 110 is provided both to descrambler 115 and to multiplexer 120. In DSS mode, multiplexer 120, in response to the Control signal status, applies the decoded data from unit 110 to output processor 125. In contrast, in both cable and satellite DVB modes as shown in Table II, the decoded data from unit 110 is first descrambled by descrambler 115. In these modes, multiplexer 120 responds to a different Control signal status and applies the descrambled output from unit 115 to output processor 125. Output processor 125 processes the output data from multiplexer 120 and provides Output Data for the system of FIG. 1. Processor 125 supplies the functions necessary to interface the Output Data to other video receiver processing networks. These functions include conforming the output data to suitable logic levels and providing a clock signal associated with the output data signal to facilitate interfacing with other video receiver networks.

Finally, the output data from unit 125 is processed by MPEG compatible transport processor 130 to provide synchronization and error indication information used in the video data decompression, although MPEG compatibility is not essential in a system employing the invention. Transport processor 130 also separates data according to type based on an analysis of header information. The data output from processor 130 is decompressed by MPEG decompressor 135 to provide video data suitable for encoding as an NTSC format signal by NTSC encoder 140. The encoded decompressed output data from unit 140 is provided to display processing circuits including a display device (not shown).

In the embodiment of FIG. 2; demodulator 10 and decoder 12 of FIG. 1 are configured via the Control signal to process the DSS satellite signal format. The networks shown in FIG. 2 perform the same functions as previously described in connection with FIG. 1. In this DSS mode, the demodulator 10 AGC loop (discussed in connection with FIG. 5 and 6) uses the QPSK slicer output via multiplexer 40. The resultant gain-controlled, filtered, digital video signal output from unit 25 is then processed, Viterbi decoded and error corrected by decoder 12 units 50 and 60. In this DSS mode unit 50 may be configured for either the ⅔ or 6/7 code rate as defined earlier. The resultant Viterbi decoded output from unit 60 is passed via multiplexer 65 to symbol to byte mapper 70. The output of mapper 70 is deinterleaved by units 75, 85, 90 and 95 which are configured for the Ramsey deinterleaver function. The deinterleaved output from memory 95 is deemed by Reed-Solomon decoder 110 and passed via multiplexer 120 to output processor 125. The decoded, demodulated output from processor 125 is processed by networks 130, 135 and 140 as described in connection with FIG. 1.

In the embodiment of FIG. 3, demodulator 10 and decoder 12 of FIG. 1 are configured via the Control signal to process the DVB satellite signal format. The networks shown in FIG. 3 perform the same functions as previously described in connection with FIG. 1. In this DVB satellite mode as in the DSS mode, the demodulator 10 AGC loop uses the QPSK slicer output via multiplexer 40. The resultant gain-controlled, filtered, digitized video signal output from unit 25 is then processed, Viterbi decoded and error corrected by decoder 12 units 50 and 60. In this DVB mode, in contrast to the DSS mode, unit 50 may be configured for five different code rates (½, ⅔, ¾, ⅚, and ⅞ rates). The resultant Viterbi decoded output from unit 60 is passed via multiplexer 65 to symbol to byte mapper 70. The mapper 70 output is deinterleaved by units 75, 80, 90 and 95 which are configured for the Forney deinterleaver function. The deinterleaved output from memory 95 is decoded by Reed-Solomon decoder 110, descrambled by unit 115 and then passed via multiplexer 120 to output processor 125. The decoded, demodulated output from processor 125 is processed by networks 130, 135 and 140 as described in connection with FIG. 1.

In the embodiment of FIG. 4, demodulator 10 and decoder 12 of FIG. 1 are configured via the Control signal to receive the DVB cable signal format. The networks shown in FIG. 4 perform the same functions as previously described in connection with FIG. 1. In this DVB cable mode the demodulator 10 AGC loop uses the QAM slicer output via multiplexer 40. The QAM slicer is configured either for a 64 or 256 point symbol constellation depending on the input signal to demodulator 10. The resultant data recovered by the selected slicer configuration at the output of multiplexer 40 is differentially decoded by unit 45 and provided to multiplexer 65 of decoder 12. The decoded output of unit 45 is passed via multiplexer 65 to symbol to byte mapper 70. The mapper 70 output is deinterleaved by units 75, 80, 90 and 95 which are configured for the Forney deinterleaver function. The deinterleaved output from memory 95 is decoded by Reed-Solomon decoder 110, descrambled by unit 115 and passed via multiplexer 120 to output processor 125. The decoded, demodulated output from processor 125 is processed by networks 130, 135 and 140 as described in connection with FIG. 1.

Both the demodulator 10 and decoder 12 functions and the means for configuring and selecting these functions may be implemented in a variety of ways. For example, instead of using multiplexers for selecting functions, a configurable logic network could be used to perform these functions. Alternatively, a tri-state logic buffering scheme could be employed to select between separate function outputs instead of using multiplexers for the selection. In addition, by applying the principles of the invention, the functions themselves may be varied to provide decoding and demodulation of other input signal formats.

What is claimed is:

1. In a system for receiving and adaptively processing a video signal encoded in one of a plurality of different formats suitable for satellite, terrestrial or cable transmission modes, apparatus comprising:

an adaptive decoder for providing a decoded output as a function of a code rate selected from a plurality of code rates, said decoded output being provided from an input signal encoded in different signal formats for different transmission modes;

an adaptive deinterleaver for deinterleaving said decoded output in accordance with a deinterleaving function selected from a plurality of deinterleaving functions, wherein said adaptive deinterleaver is configured with said selected deinterleaving function; and an output signal processor for processing deinterleaved output data.

2. Apparatus according to claim 1, wherein said adaptive decoder is an adaptive Viterbi decoder configured with a selected decoding function to decode said input signal.

3. Apparatus according to claim 1, wherein said output processor includes a descrambler for descrambling said deinterleaved output data and said deinterleaved output data bypasses said descrambler when said input signal exhibits a predetermined format.

4. Apparatus according to claim 1 further including a demodulator for demodulating a modulated video input signal to provide said input signal encoded in different signal formats.

5. In a system for receiving and adaptively processing a video signal encoded in one of a plurality of different formats suitable for satellite, terrestrial or cable transmission, apparatus comprising:

an adaptive decoder for providing a first decoded output as a function of a code rate selected from a plurality of code rates;

an adaptive deinterleaver for deinterleaving said first decoded output in accordance with a deinterleaving function selected from a plurality of deinterleaving functions; and an output signal processor for processing deinterleaved output data wherein said adaptive decoder is bypassed when said encoded video signal exhibits a predetermined format.

6. Apparatus according to claim 5, further including a differential decoder for providing a differentially decoded output as said first decoded output when said encoded video signal exhibits said predetermined format.

7. Apparatus according to claim 4, wherein said demodulator demodulates a QAM modulated video input signal.

8. Apparatus according to claim 1, further including an adaptive byte mapper for selectively mapping data to be deinterleaved as a function of said different signal formats and different symbol constellations of said input signal.

9. Apparatus according to claim 7, wherein said demodulator demodulates a QPSK modulated video input signal.

10. Apparatus according to claim 1, wherein said adaptive decoder and adaptive deinterleaver are automatically configured to be compatible with the format of said encoded video signal in response to an estimate of error in said deinterleaved output data.

11. Apparatus according to claim 1, further including an adaptive error processor for correcting errors in said deinterleaved output data, said error processor adapting between different signal formats by changing at least one of: (a) error function type, (b) error correction code length, and (c) data packet length.

12. Apparatus according to claim 11, wherein said adaptive error processor adapts between different signal formats by adapting to parity data in said deinterleaved output data.

13. Apparatus according to claim 11, wherein said adaptive error processor is a Reed-Solomon decoder.

14. In a system for receiving and adaptively processing a video signal encoded in one of a plurality of different formats suitable for satellite, terrestrial or cable transmission modes, apparatus comprising:

an adaptive decoder for providing a decoded output as a function of a code rate selected from a plurality of code rates, said decoded output being provided from an input signal encoded in different signal formats for different transmission modes;

an adaptive error decoder for detecting and correcting errors in said decoded output, said error decoder adapting between different signal formats by changing at least one of: (a) error function type, (b) error correction code length, and (c) data packet length; and an output signal processor for processing said error corrected data.

15. Apparatus according to claim 14, wherein said adaptive error decoder is a Reed-Solomon decoder.

16. In a system for receiving and adaptively processing a video signal encoded in one of a plurality of different formats suitable for satellite, terrestrial or cable transmission, apparatus comprising:

an adaptive deinterleaver for deinterleaving said encoded video signal in accordance with a deinterleaving function selected from a plurality of deinterleaving functions; and an adaptive error decoder for detecting and correcting errors in said deinterleaved output, said error decoder adapting between different signal formats by changing at least one of: (a) error function type, (b) error correction code length, and (c) data packet length; and an output signal processor for processing said error corrected data.

17. Apparatus according to claim 16, wherein said adaptive error decoder function is a Reed-Solomon function.

18. Apparatus according to claim 16, wherein said adaptive deinterleaver is configured with said selected deinterleaving function.

19. A method for adaptively processing a video signal encoded in one of a plurality of different formats suitable for satellite, terrestrial or cable transmission modes, comprising the steps of:

adaptively decoding an input signal as a function of a code rate selected from a plurality of code rates to provide a decoded output, said input signal being encoded in different signal formats for different transmission modes;

selecting a deinterleaving function from a plurality of deinterleaving functions;

configuring said adaptive deinterleaver with said selected deinterleaving function;

adaptively deinterleaving said decoded output using said selected deinterleaving function; and processing said deinterleaved data.

20. A method of adaptively processing a video signal encoded in one of a plurality of different formats suitable for satellite, terrestrial or cable transmission, comprising the steps of:

selecting a code rate from a plurality of code rates;

adaptively decoding an input signal encoded in different signal formats for different transmission modes as a function of said selected code rate to provide a decoded output;

adaptively detecting errors in said decoded output;

adaptively correcting said detected errors in said decoded output by changing at least one of: (a) error function type, (b) error correction code length, and (c) data packet length; and processing said error corrected data.

21. A method for adaptively processing a video signal encoded in one of a plurality of different formats suitable for satellite, terrestrial or cable transmission, comprising the steps of:

selecting a deinterleaving function from a plurality of deinterleaving functions;

adaptively deinterleaving said decoded output using said selected deinterleaving function;

detecting errors in deinterleaved output of different signal formats;

adaptively correcting an error in deinterleaved output of different signal formats by changing at least one of: (a) error function type, (b) error correction code length, and (c) data packet length; and processing said error corrected data.

22. A method according to claim 21 further including the step of configuring said adaptive deinterleaver with said selected deinterleaving function.

* * * * *